United States Patent
Tezuka (10) Patent No.: US 6,275,608 B1
(45) Date of Patent: *Aug. 14, 2001

(54) IMAGE PROCESSING METHOD AND APPARATUS AND MEMORY MEDIUM

(75) Inventor: Nobuhiko Tezuka, Utsunomiya (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/760,211

(22) Filed: Dec. 4, 1996

(30) Foreign Application Priority Data

Dec. 14, 1995 (JP) .................................................. 7-325633

(51) Int. Cl.$^7$ ..................................................... G06K 9/34
(52) U.S. Cl. ........................... 382/175; 382/176; 382/317
(58) Field of Search .................................. 382/202, 175, 382/317, 141, 173, 174, 176, 177, 178–180, 321; 358/462

(56) References Cited

U.S. PATENT DOCUMENTS

| | | | |
|---|---|---|---|
| 4,998,285 | * 3/1991 | Suzuki et al. | 382/173 |
| 5,048,107 | * 9/1991 | Tachikawa | 382/173 |
| 5,075,895 | * 12/1991 | Bessho | 382/175 |
| 5,091,964 | * 2/1992 | Shimomura | 382/176 |
| 5,111,514 | * 5/1992 | Ohta | 382/173 |
| 5,119,437 | * 6/1992 | Kuwamura et al. | 382/173 |
| 5,452,380 | * 9/1995 | Uehara et al. | 382/317 |
| 5,668,892 | * 9/1997 | Itonori | 382/177 |
| 5,680,478 | * 10/1997 | Wang et al. | 382/176 |
| 5,729,635 | * 3/1998 | Fast et al. | 382/254 |
| 5,737,442 | * 4/1998 | Alam | 382/175 |
| 5,774,580 | * 6/1998 | Saitoh | 382/176 |

FOREIGN PATENT DOCUMENTS 6-96275   4/1994   (JP) .

OTHER PUBLICATIONS

"Public Domain Optical Character Recognition", by Michael D. Garris, et al., Document Recognition 2, San Jose, Feb. 6–7, 1995, vol.2422, pp. 2–14.

* cited by examiner

Primary Examiner—Bhavesh Mehta
(74) Attorney, Agent, or Firm—Fitzpatrick, Cella, Harper & Scinto (57) ABSTRACT

It is an object of the invention to correctly recognize a delimiter of character trains included in image information. Namely, an object of the invention is to correctly recognize and extract not only an image divided every column by lateral rules but also an image which is not divided every column by lateral rules on a column unit basis. For this purpose, according to the invention, attributes regarding whether a table image extracted from the image information is a table without lateral rule or not are discriminated in accordance with characteristics of line images which are extracted from the image information. In accordance with the attributes, whether line delimiter information is added every line image extracted or not is determined, so that the character trains included in the table image which is not divided every unit column by the lateral rules can be divided every column and recognized.

39 Claims, 6 Drawing Sheets

IMAGE PROCESSING METHOD AND APPARATUS AND MEMORY MEDIUM

BACKGROUND OF THE INVENTION

1. Field of the Invention

The invention relates to an image processing apparatus of an OCR (optical character recognizing) apparatus, a copying machine, a facsimile, or the like and, more particularly, to image processing method and apparatus and memory medium which can properly extract characters from an input image including a table image.

The invention also relates to image processing method and apparatus and memory medium which can discriminate a format of an input table and properly extract a character image when the character image is extracted from an input table image.

The invention also relates to image processing method and apparatus and memory medium which can automatically discriminate attributes of a table image included in an input image without manually designating the attributes by the user.

2. Related Background Art

An OCR apparatus having an automatic area dividing function performs processes to automatically discriminate an image surrounded by rules as a table image and extract a cell surrounded by the rules of a table as one character area.

After characters were recognized, by inserting a tab code between character trains of a result of the recognition obtained from one character area and inserting a return code between lines, information of the cell extracted from the table image is reflected to document data after completion of the recognition of characters, thereby enabling data to be easily supplied to table calculating software or the like.

Figure 7:
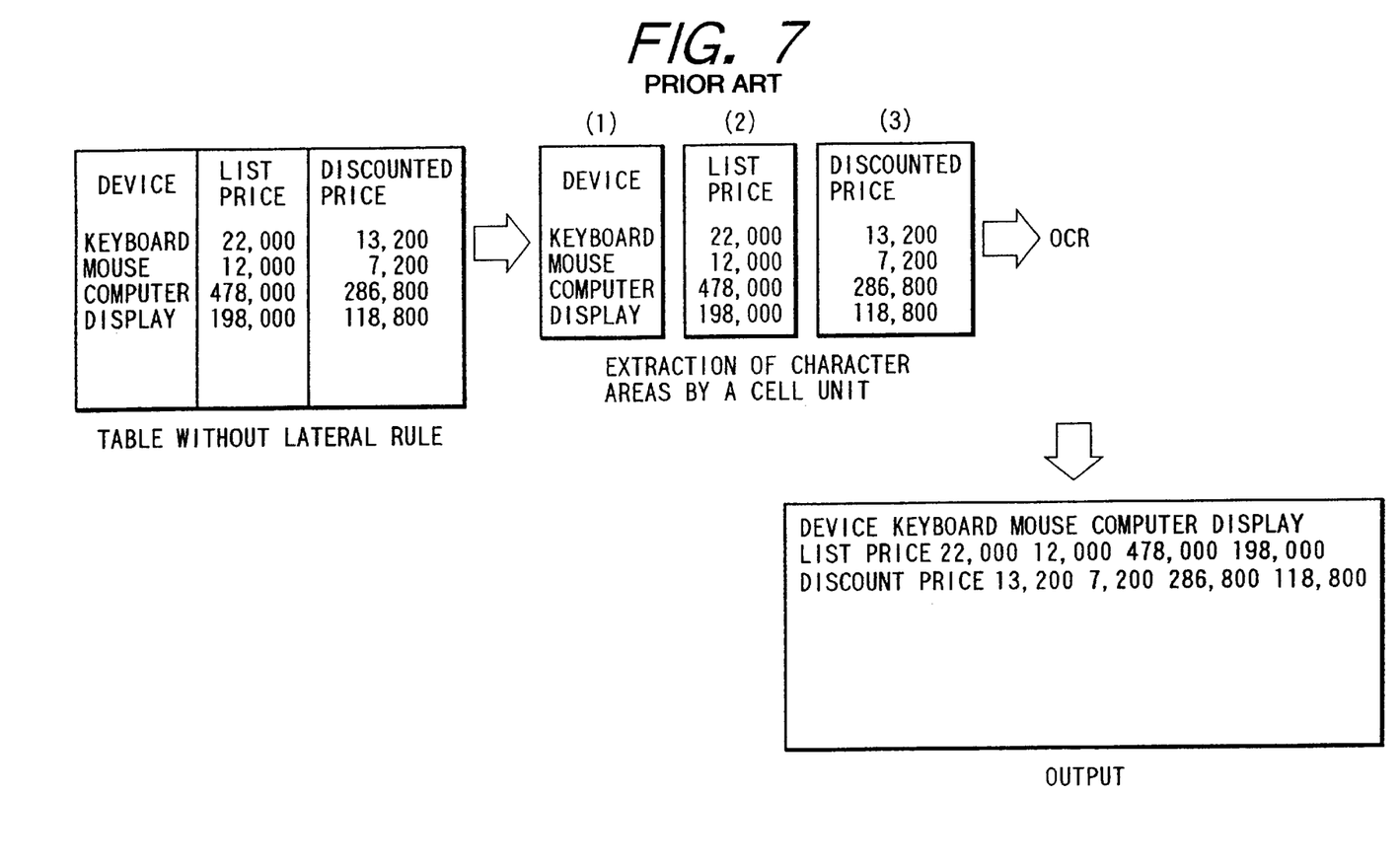
FIG. 7 is an explanatory diagram of a conventional table image process.

According to the foregoing conventional technique, however, when the table image serving as a target of the character recognition is a table without lateral rule, as shown in FIG. 7, since a plurality of items arranged in the vertical direction are discriminated as one character area, a document of a form different from that of the input table is obtained and the operation to correct the form to that of the input table is forced on the operator, so that a burden on the operator is increased.

SUMMARY OF THE INVENTION

According to the invention, as mentioned above, a line image is extracted from image information, attributes of the image information are discriminated in accordance with characteristics of the extracted line image, and the discriminated attributes are stored in correspondence to the image information, so that table attributes indicating whether a table image inputted is a table with lateral rules or a table without lateral rule and the like don't need to be manually designated by the operator, the table attributes can be automatically discriminated, and an operability can be improved.

According to the invention as described above, by setting the image information to the image information surrounded by the rules, a plurality of items included in one cell surrounded by the rules can be automatically discriminated.

According to the invention as described above, by setting the image information to the image information which was optically read out, the optical read-out image can be automatically processed without operating keys or the like.

According to the invention as described above, by recognizing the line image as a character and outputting a line delimiter code together with a result of the character recognition, the form of the table can be maintained even after a document was formed by the character recognition.

According to the invention as described above, by displaying a document in accordance with the outputted information, a result of the character recognition of the input image and the form of the table can be confirmed on a display picture plane.

According to the invention as described above, the input image information is divided into small image areas surrounded by rules, line images are extracted from the image information of the divided small image areas, and the line images included in the input image information are ordered in accordance with the positional relation of the small image areas where the line images are located and the positions in the small image areas, so that a form of a special table without lateral rule can be properly discriminated.

According to the invention as described above, by discriminating the attributes of the image information and deciding whether the extraction of the line images is executed or not in accordance with a result of the discrimination of the attribute discriminating means, a proper process is executed in only the proper case, so that the form of the table can be maintained even after a document was formed by the character recognition.

DETAILED DESCRIPTION OF THE PREFERRED EMBODIMENT

Figure 1:
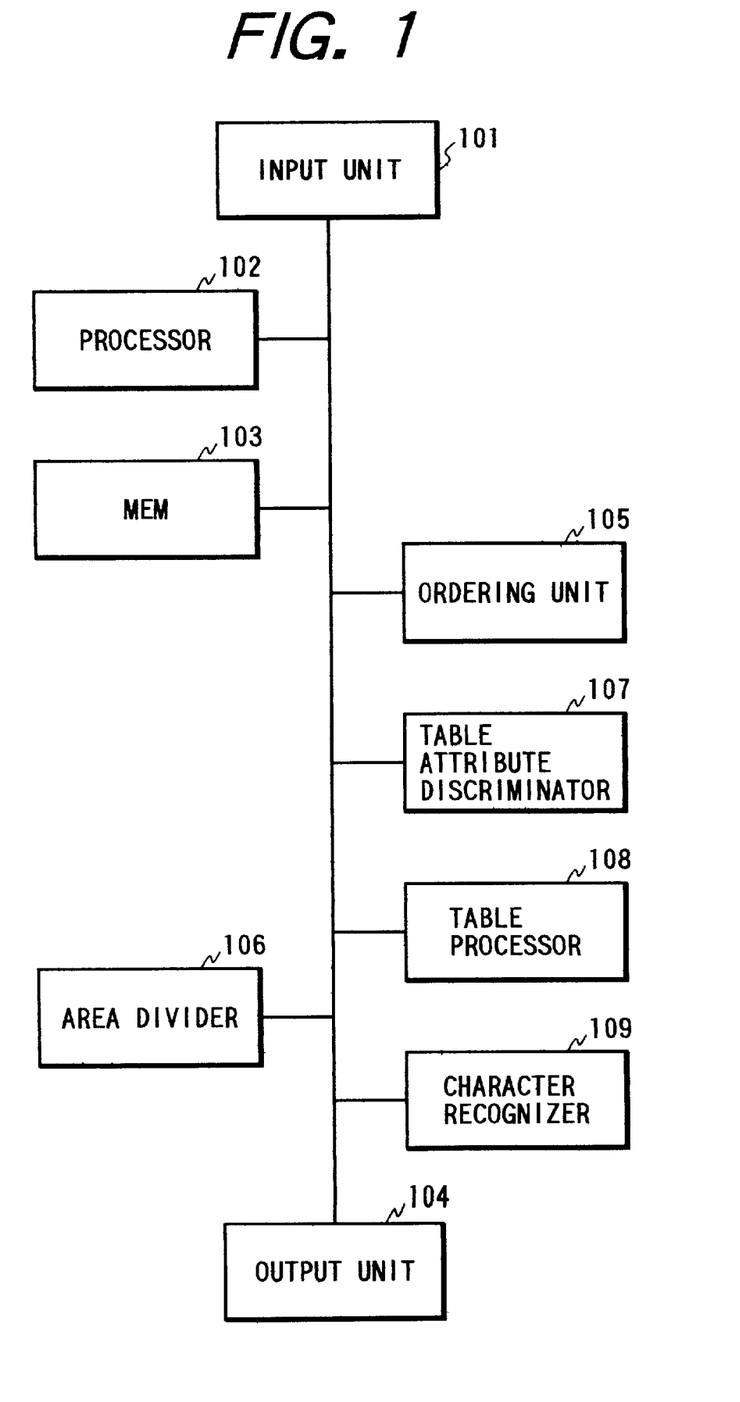
FIG. 1 is a block diagram of a functional construction of an image processing apparatus.

FIG. 1 is a block diagram of a functional construction of an example of an image processing apparatus of the invention. Reference numeral 101 denotes an input unit for inputting image information serving as a target of a character recognition and various instructions which are performed by the operator. The input unit 101 has a keyboard to perform an edition of a document and the like. As for the input of the image information, the image information can be inputted by a scanner for optically reading an original or the image information which has already been optically read can also be inputted through a memory apparatus or communicating means. Reference numeral 102 denotes a processor (CPU) for performing a control of the apparatus and an arithmetic operation and a control of each processing unit in accordance with control programs of flowcharts, which will be described hereinlater; and 103 indicates a memory for storing the control programs for the processor 102 to execute processes shown in flowcharts, which will be described hereinafter, data which is used in various processes, or data which occurs during the various processes. As control programs of the processes according to the invention which are stored in the memory 103, it is possible to use a control program stored in a memory medium such as FD or CD-ROM which is detachable from the apparatus or a control program which is supplied from another terminal through a communication line and is stored. Reference numeral 104 denotes an output unit for outputting a result of an arithmetic operating process, a result of an image process, and image data. The output unit 104 includes display means such as CRT, liquid crystal display, or the like, printing means such as LBP, color ink jet printer, or the like, and an output terminal for outputting to the other terminals or external memory means. Reference numeral 105 indicates an ordering unit for ordering paragraphs and headlines of sentences included in the image information; 106 an area divider for performing an area dividing process of the image information; 107 a table attribute discriminator for automatically discriminating attributes of a table image included in the image information by detecting and analyzing characteristics of the table image; 108 a table processor for executing processes to extract a table format from the table image included in the image information and form a document; and 109 a character recognizer for extracting a character image from the image information and recognizing the extracted character image.

Figure 2:
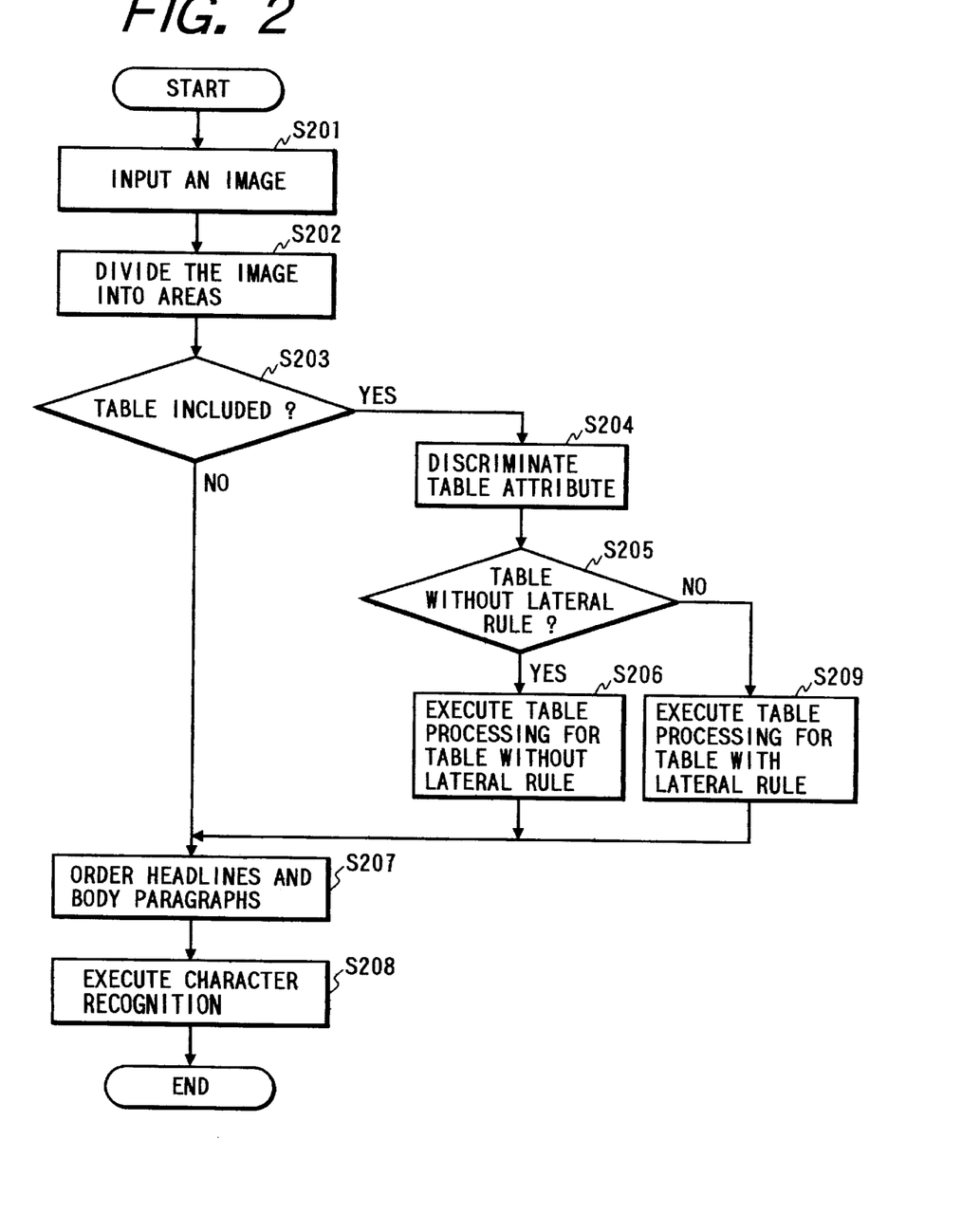
FIG. 2 is a flowchart for a whole process.

FIG. 2 is a flowchart showing a flow of the whole process which is executed for a period of time from the input of an image from the input unit 101 to the character recognition and generation as document data from the output unit 104. The control programs have been stored in the memory 103 and is executed by the control of the processor 102.

Figure 3:
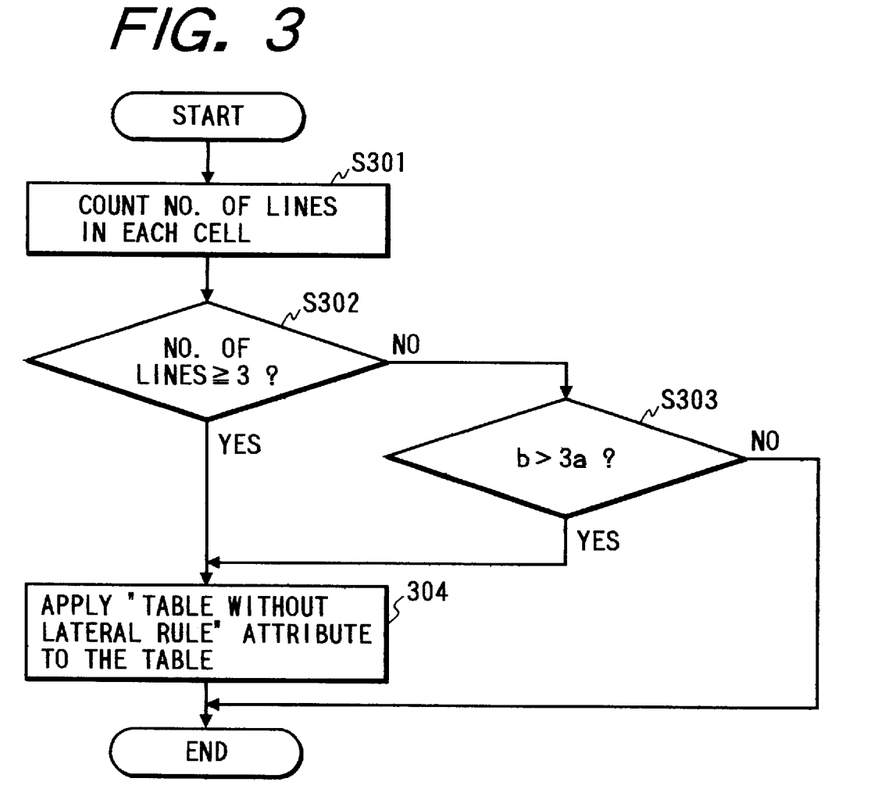
FIG. 3 is a flowchart for a table attribute discriminating process.

Image information is inputted from the input unit 101 (S201). The input image information can also be displayed by display means included in the output unit 104 and be confirmed by the operator. The input image is divided into areas by the area divider 106 and image data areas such as document, separator, figure, table, and the like are extracted (S202). Information of the extracted image data areas is stored into the memory 103. As a detailed method for the area division, there is a technique disclosed in Japanese Patent Application No. 4-243252 or the like. As a result of the area division, when a table image is included in the input image (YES in S203), step S204 follows and a process to automatically discriminate attributes of the table image is performed (S204). The automatic discriminating process of the attributes of the table image in step S204 is shown in detail in a flowchart of FIG. 3 shows and will be described hereinbelow in detail. As a result of the discrimination of the table attributes in step S204, when the table image is a table without lateral rule (YES in S205), step S206 follows and a table process for the table without lateral rule is performed. The table process for the table without lateral rule in step S206 is a process for extracting on a unit basis of a character unit (corresponding to a cell) and ordering on a unit basis of the extracted character in order to hold a table format of the table image without lateral rule and form a document and will be explained in detail hereinafter with reference to a flowchart of FIG. 4. As a result of the discrimination of the table attributes in step S204, when the table image is a table with lateral rules (NO in S205), step S209 follows and a table process for the table with lateral rules is performed. The table process for the table with lateral rules in step S209 is a process for extracting cells and ordering the extracted cells in order to hold a table format and form a document. In the ordering process, the numbers are added in accordance with the order from the left to the right and from top to the bottom. The order in this instance is the same as that in step S402 in the flowchart of FIG. 4, which will be described hereinlater.

When the absence of the table is determined in step S203 and the process in step S206 or S209 is finished, step S207 follows and headlines and body paragraphs constructed by sentence portions excluding the table image of the input image are ordered by the ordering unit 105. When ordering, for example, in case of sentences written in the vertical direction, the ordering is performed from the right to the left. In a manner similar to the above, with respect to the vertical direction, the ordering is performed from the top to the bottom.

In step S208, a character recognizing process is executed by the character recognizer 109 and character trains are outputted in accordance with the order added in steps S206, S209, and S207 and a document formation of the input image is finished. With regard to the output of the characters included in the table image, a tab code as a code indicative of a cell delimiter is inserted between cells and a return code as a code indicative of a line delimiter is inserted between lines.

As mentioned above, by performing the processes shown in the flowchart of FIG. 2, even when the table without lateral rule is included in the input image, the table without lateral rule is automatically discriminated without manually designating such a fact by the operator, the table format of such a table is held, and a document can be formed.

Figure 5:
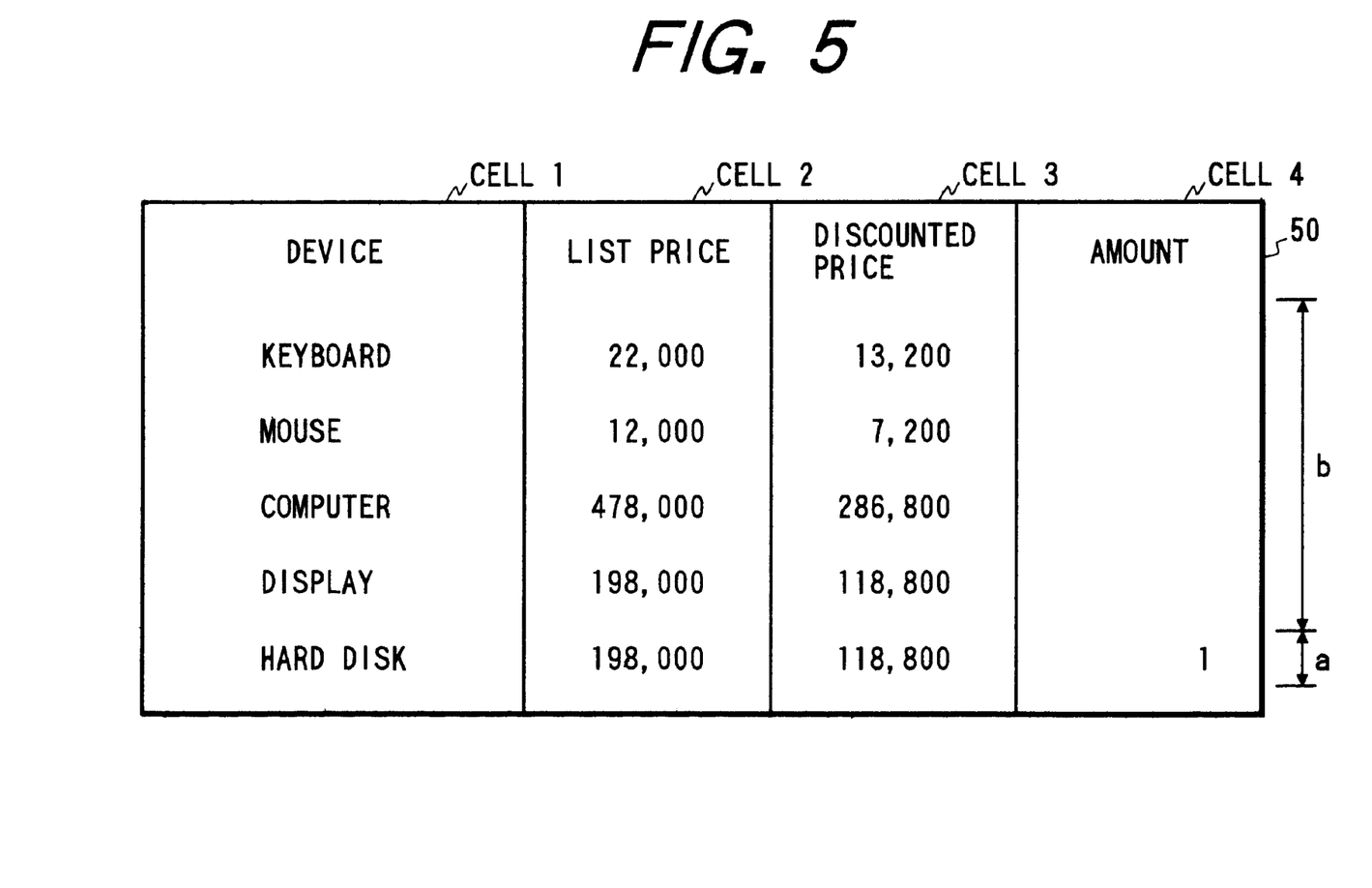
FIG. 5 is a diagram showing an example of a table image to which the table attribute discriminating process is performed.

The automatic discriminating process for the table attributes which is executed by the table attribute discriminator 107 in step S204 will now be described hereinbelow with reference to the flowchart of FIG. 3. The target in the process is the image in the area determined as a table image by the area dividing process in step S202 and is shown as an example in FIG. 5.

The cells (cells 1 to 4) surrounded by the rules in a table image 50 are first extracted and the number of character lines in each cell is counted (S301). For example, each of the cells 1 to 3 has six lines and the cell 4 has two lines. Subsequent discriminating processes in steps S302 and S303 are executed with respect to all of the cells extracted in step S301. The process in step S302 is a process for discriminating whether the number of lines counted in step S301 is equal to or larger than 3 or not. The process in step S303 is a process for discriminating the relation between a height a of character image included in the cell and an interval b in a vertical character direction of the character image and for discriminating whether $b>3a$ or not. When there is a cell in which it is judged as YES in step S302 or S303, the table image of such a cell is decided as a table without lateral rule and attributes of the table without lateral rule are stored in addition to the area information of the table image stored in the memory 103 (S304). With respect to all of the cells of the table images as targets, when it is determined to be NO in both steps S302 and S303, the table image is decided to be a table with lateral rules and the attributes of the table with lateral rules are stored in addition to the area information of the table image stored in the memory 103. Since it is decided in step S302 that the number of lines is equal to three or more in each of the cells 1 to 3 of the table image shown as an example in FIG. 5 and it is also determined that the interval between two lines in the cell 4 is large and $b>3a$, the attributes of the table without lateral rule are stored into the memory 103 in step S304.

By the processes of the flowchart of FIG. 3, whether the table image included in the input image is a table image with lateral rules or a table image without lateral rule can be automatically discriminated without manually designating by the operator.

Figure 4:
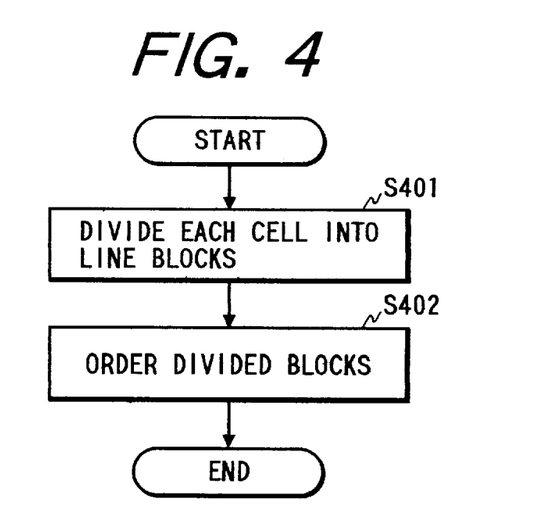
FIG. 4 is a flowchart for a process of a table without lateral rule.

The process for the table without lateral rule which is executed by the table processor 108 in step S206 will now be described with reference to the flowchart of FIG. 4. The target in the process is an image of the area determined as a table image by the area dividing process in step S202 and is like a table image 60 shown as an example in FIG. 6.

Figure 6:
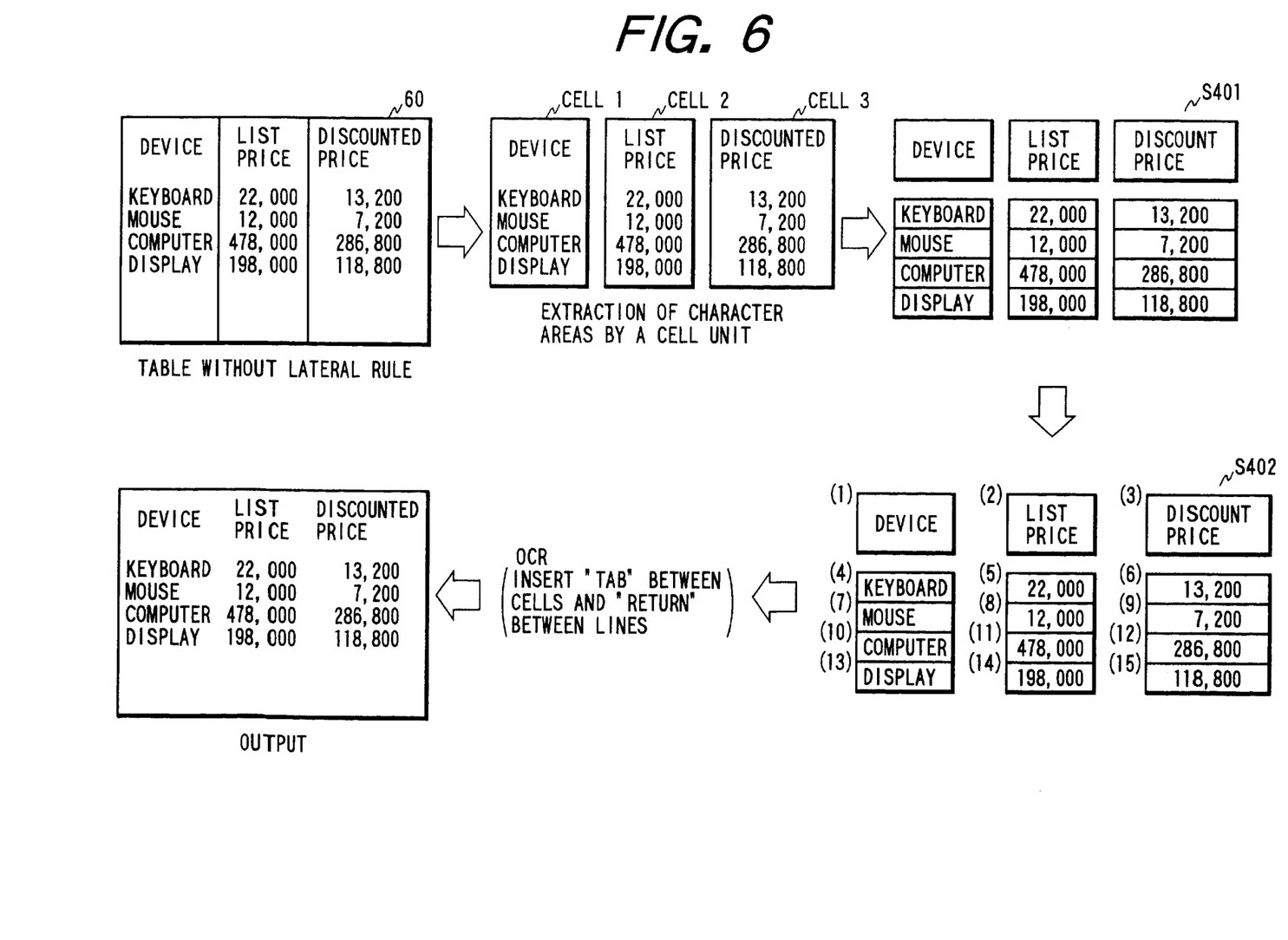
FIG. 6 is an explanatory diagram of a process of a table without lateral rule.

Each of the cells 1 to 3 extracted from the table image 60 is divided into blocks on a line unit basis (S401). The cell 1 is divided into five line blocks. Each of the cells 2 and 3 is also similarly divided into five line blocks. The blocks divided in step S401 are ordered (S402). The ordering is performed from the left to the right and further from the top to the bottom. Therefore, the ordering process is executed in a manner such that the top block of the cell 1 is set to the first order (1), the top block of the cell 2 is set to (2), and the top block of the cell 3 is set to (3). Since the cells are finished at the cell 3 in the lateral direction, the ordering is shifted in the lower direction and is performed in a manner such that the second block from the top of the cell 1 is set to (4), the second block from the top of the cell 2 is set to (5) . . . Such order information is stored in the memory 103 together with block information.

As mentioned above, since a plurality of items in one cell are divided by extracting the blocks on a line unit basis and the ordering is also executed, in case of the table without lateral rule as well, in a manner similar to the table with lateral rules, the extraction of the character trains and the ordering are executed every cell and a document is formed in accordance with the order, so that the table format can be held.

What is claimed is:

1. An image processing apparatus comprising:
   cell extracting means for extracting cells bounded by ruled lines defining a table from an input image;
   character lines extracting means for extracting character lines from each cell, each of the character lines comprising a respective line of characters;
   dividing means for dividing each cell into a plurality of blocks on the character line unit basis; and
   memory means for storing information of the plurality of blocks.

2. An apparatus according to claim 1, wherein said input image is optically read.

3. An image processing method comprising the steps of:
   extracting cells bounded by ruled lines defining a table from an input image;
   extracting character lines from each cell, each of the character lines comprising a respective line of characters;
   dividing each cell into a plurality of blocks on the character line unit basis; and
   storing information of the plurality of blocks.

4. A method according to claim 3, wherein said input image is optically read.

5. A memory medium for storing a program for controlling an image processing apparatus, with the program comprising the steps of:
   extracting cells bounded by ruled lines defining a table from an input image;
   extracting character lines from each cell, each of the character lines comprising a respective line of characters;
   dividing each cell into a plurality of blocks on the character line unit basis; and
   storing information of the plurality of blocks.

6. An image processing apparatus according to claim 1, further comprising means for judging whether the cell is divided into the plurality of blocks, and, if so, the dividing means is operable to divide the cell into blocks containing the respective character lines.

7. An image processing apparatus according to claim 1, wherein said extraction of the cell is performed in an image in a table area.

8. An image processing apparatus according to claim 1, further comprising means for judging a relative positional relationship of said blocks and means for, based on the judgment of the relative positional relationship, designating order to each blocks.

9. An image processing apparatus according to claim 8, wherein the designation of order of each blocks is performed from top to bottom.

10. An image processing apparatus according to claim 8, wherein the designation of order of each blocks is performed from left to right.

11. An image processing apparatus according to claim 1, further comprising means for recognizing and documenting characters in said cell.

12. An image processing apparatus according to claim 1, wherein said block includes an image of single line.

13. An image processing method according to claim 3, further comprising the step of judging whether the cell is divided into the plurality of blocks, and, if so, it is operable to divide the cell into blocks containing the respective character lines in said dividing step.

14. An image processing method according to claim 3, wherein said extraction of the cell is performed in an image in a table area.

15. An image processing method according to claim 3, further comprising a step for judging a relative positional relationship of said blocks and means for, based on the judgment of the relative positional relationship, designating order to each blocks.

16. An image processing method according to claim 15, wherein the designation of order of each blocks is performed from top to bottom.

17. An image processing method according to claim 15, wherein the designation of order of each blocks is performed from left to right.

18. An image processing method according to claim 3, further comprising the step of recognizing and documenting characters in said cell.

19. An image processing method according to claim 3, wherein said block includes an image of single line.

20. An image processing method according to claim 1, wherein each of each plurality of blocks is given a block order number respectively.

21. An image processing method according to claim 3, wherein each of each plurality of blocks is given a block order number respectively.

22. A memory medium according to claim 5, wherein said input image is optically read.

23. A memory medium according to claim 5, further comprising the step of judging whether the cell is divided into the plurality of blocks, and, if so, it is operable to divide the cell into blocks containing the respective character lines in said dividing step.

24. A memory medium according to claim 5, wherein said extraction of the cell is performed in an image in a table area.

25. A memory medium according to claim 5, further comprising the step for judging a relative positional relationship of said blocks and means for, based on the judgment of the relative positional relationship, designating order to each blocks.

26. A memory medium according to claim 25, wherein the designation of order of each blocks is performed from top to bottom.

27. A memory medium according to claim 25, wherein the designation of order of each blocks is performed from left to right.

28. A memory medium according to claim 5, further comprising the step of recognizing and documenting the characters in said cell.

29. A memory medium according to claim 5, wherein said block includes an image of single line.

30. A memory medium according to claim 5, wherein each of each plurality of blocks is given a block order number respectively.

31. An image processing apparatus according to claim 6, wherein the judge of the judging means is executed on the basis of a relative positional relationship of the character lines.

32. An image processing apparatus according to claim 6, wherein the judge of the judging means is executed on the basis of the number of the character lines in each cell.

33. An image processing apparatus according to claim 1, wherein the block is handled like a cell.

34. An image processing method according to claim 13, wherein said judging is executed on the basis of a relative positional relationship of the character lines.

35. An image processing method according to claim 13, wherein said judging is executed on the basis of the number of the character lines in each cell.

36. An image processing method according to claim 3, wherein the block is handled like a cell.

37. A memory medium according to claim 23, wherein said judging is executed on the basis of a relative positional relationship of the character lines.

38. A memory medium according to claim 23, wherein said judging is executed on the basis of the number of the character lines in each cell.

39. A memory medium according to claim 5, wherein the block is handled like a cell.

* * * * *

UNITED STATES PATENT AND TRADEMARK OFFICE
CERTIFICATE OF CORRECTION

PATENT NO. : 6,275,608 B1
DATED : August 14, 2001
INVENTOR(S) : Nobuhiko Tezuka

It is certified that error appears in the above-identified patent and that said Letters Patent is hereby corrected as shown below:

Column 4,
Line 65, "rule" should read -- rules --.

Column 5,
Line 42, "An apparatus" should read -- An image processing apparatus --; and
Line 54, "A method" should read -- An image processing method --.

Column 6,
Line 48, "claim 1," should read -- claim 3, --.

Signed and Sealed this

Ninth Day of July, 2002

*Attest:*

JAMES E. ROGAN
*Director of the United States Patent and Trademark Office*

*Attesting Officer*